April 13, 1943.   R. E. FEARON   2,316,576
WELL SURVEYING METHOD AND APPARATUS
Filed Aug. 14, 1940
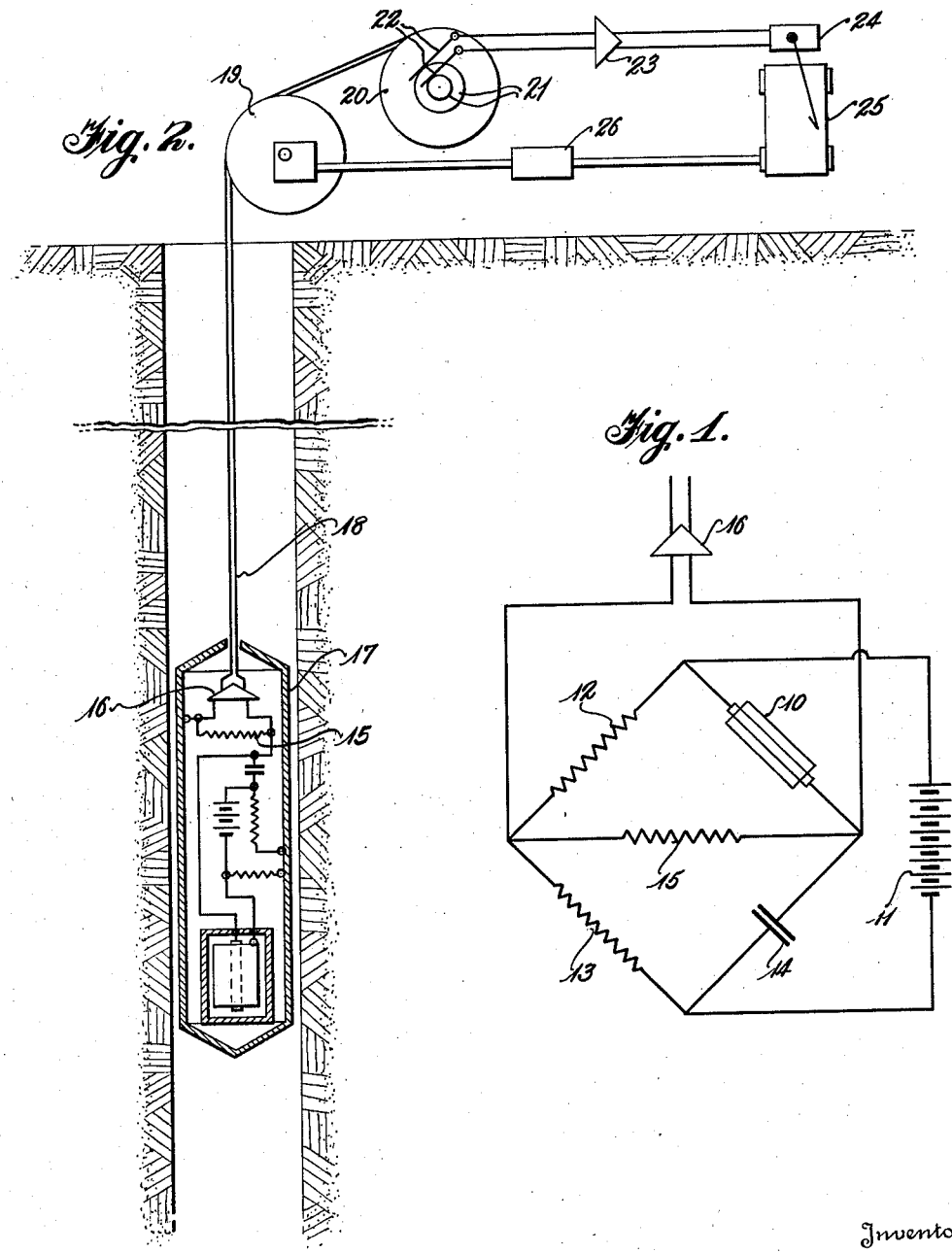
Inventor
Robert E. Fearon
By Stevens and Davis
Attorneys Patented Apr. 13, 1943

2,316,576

UNITED STATES PATENT OFFICE 2,316,576

WELL SURVEYING METHOD AND APPARATUS

Robert Earl Fearon, Tulsa, Okla., assignor to Well Surveys, Incorporated, Tulsa, Okla., a corporation of Delaware Application August 14, 1940, Serial No. 352,609

6 Claims. (Cl. 250—83.6)

This invention relates to ionization chamber circuits and particularly to a type of circuit especially adapted for use with one or more ionization chambers that are to be lowered into well bores or the like to measure radioactive radiations at points below the surface of the earth.

It is common practice to measure various types of radioactive radiations by the use of ionization chambers such as the familiar Geiger-Müller counter. Such ionization chambers usually consist of a pair of electrodes spaced apart in a gaseous medium. In the case of the Geiger-Müller counter the pressure of the gaseous medium is quite low, perhaps a few centimeters of mercury. Other ionization chambers have been proposed and used in which the gaseous medium is argon or some other inert gas and the pressure as high as 1500 pounds to the square inch.

With any of these ionization chambers an electrical circuit is necessary and this circuit usually consists of a source of potential and a relatively high fixed resistance connected in series across the electrodes of the ionization chamber. Two important variables upon which the current flow in this circuit depends are the applied voltage and the extent of the ionization in the ionization chamber. This latter factor in turn depends upon the intensity of the radiations impinging upon the gas therein. The voltage drop across the fixed resistor, being a measure of the current flow, may be amplified and used to operate a suitable recorder or meter.

When circuits such as the one described above are used on the surface of the earth the voltage applied to the ionization chamber can be maintained fairly constant and thus the resultant measurement is substantially of radiations only. Under any condition where this is not possible, however, as for example when the whole assembly must be lowered into a drill hole to make measurements far below the surface, or even if the source of potential is permitted to remain on the surface and the necessary potential merely conveyed down into the bore hole by conductors, a serious problem arises due to the variation in the effective voltage of the voltage source. Particularly, when a battery is used as the source of voltage and is lowered into a drill hole with the ionization chamber and resistor, the differences in temperature encountered and other factors such as the state of charge or discharge of the battery effect such changes in the battery voltage as to greatly influence the voltage across the resistor.

From the consideration of the type of circuit that has been used before, it will be immediately apparent that if the ionization chamber is treated as a condenser, and if the source of voltage has a time rate of change of its voltage, there will be a displacement current which will appear in the ionization chamber and will be measured by the measuring circuit. Such a displacement current will be indistinguishable from the ionization current which it is desired to measure. The occurrence of such a displacement current will constitute a considerable source of error, which it is desirable to avoid. Such error can be eliminated, either by providing large batteries maintained in a temperature controlled environment; a procedure practicable only in the laboratory, or by providing the means of compensating for displacement current, such as that of the present invention.

It has now been discovered that by a rearrangement of the ionization chamber circuit the effect on the output voltage of such changes in the applied voltage can be greatly reduced. Briefly, this change in the ionization chamber circuit consists in forming a bridge with the ionization chamber as one leg thereof, fixed resistors as two of the other legs and a condenser as the fourth leg. The resistor across which the output voltage is to be developed is then connected diagonally across the bridge in one direction and the source of power diagonally across the bridge in the other direction.

With this arrangement when the bridge is in balance there will be no voltage developed across the output resistor regardless of the voltage or changes in voltage of the power supply. However as the internal resistance of the ionization chamber changes the bridge will become unbalanced and a voltage will be generated. The amount of this voltage will depend partly on the potential of the power supply but the potential of the power supply will only partially govern this voltage and will not enter into the voltage across the output resistor as an independent factor as would be the case in a circuit of the type that has been previously used. Since these variations in the voltage of the power supply only enter indirectly through their effect on the unbalanced bridge, their interference with accurate measurement is of a much lower order than would be the case with the older type of circuit.

For a more complete understanding of the details and advantages of this invention reference may be had to the appended drawing and the following detailed description of the embodiment shown therein. It is to be understood, however, that the embodiment shown is used only for the purpose of illustration and that many modifications thereof are contemplated within the scope of the present invention.

In the drawing:

Figure 1 is a diagrammatic illustration of the essential circuit elements according to this invention, and;

Figure 2 is a diagrammatic illustration of a complete device for measuring the naturally emitted radioactive radiations encountered at various depths in a drill hole of the type ordinarily used to obtain oil.

As illustrated in Figure 1, an ionization chamber 10 is supplied with an operating voltage from a battery 11 by being connected in a bridge circuit in which the legs are composed of a pair of fixed resistors 12 and 13, the ionization chamber 10 and a condenser 14. An output resistor 15 is connected diagonally across the bridge from a point between the condenser 14 and the ionization chamber 10 to a point between the resistors 12 and 13. An amplifier 16 is also connected with its input diagonally across the bridge in this same direction. The battery 11 is connected diagonally across the bridge in the other direction, that is to a point between the ionization chamber 10 and one of the leg resistors 12 and to a point between the condenser 14 and the other leg resistor 13.

In such a circuit the output resistor 15 preferably has a resistance of around $10^{12}$ ohms, the leg resistances 12 and 13 are equal and have sufficient resistance between them to prevent too heavy a drain on the battery and the condenser 14 a capacity that about balances that of the ionization chamber. In one type of ionization chamber that can be satisfactorily used in well surveying the ionization chamber may have a capacity of four litres of gas and be filled with argon at 1000 pounds per square inch of pressure. Under such circumstances the capacity may be of the order of $2.5 \times 10^{-11}$ farads and this same capacity may be used for the condenser 14. Under such circumstances the leg resistors 12 and 13 should be around $10^4$ ohms each. The voltage applied by the battery 11 may be of the order of 180 volts.

With such a circuit as long as there were no current flowing through the ionization chamber 10 there would be no voltage generated across the output resistor 15 but as radiations impinge on the ionization chamber 10 the bridge will become unbalanced and a voltage will be developed across the output resistor which will affect the input to the amplifier 16 which in turn can control the necessary recording or measuring equipment.

A change in the battery voltage under such circumstances will affect the output resistor voltage only as it affects the flow of current through the ionization chamber and hence it has only a secondary or minor effect on this output voltage rather than a direct or separate effect as would be the case in the older types of circuits in which the battery, the output resistor and the ionization chamber were connected directly in series.

It may seem upon first inspection that the bridge would be better balanced by substitution of a third leg resistor for the condenser 14 but a study of the characteristics of the ionization chamber 10 reveals this not to be the case. In an ionization chamber such as the one mentioned above the capacity of the ionization chamber is in the neighborhood of $2.5 \times 10^{-11}$ farads which even at the very low frequency of 0.0001 cycle is equivalent to an impedance of $6 \times 10^{13}$ ohms, approximately. The resistance of the gas between the electrodes is of the order of $5 \times 10^{17}$ ohms which is of the order of eight thousand times greater. It will therefore be apparent that the conductance of the ionization chamber even at extremely low frequencies is more dependent upon changes in capacity than upon changes in resistance. Since variations in battery voltage often involve appreciable amplitudes of current at 0.0001 cycle or even higher frequencies due to rapid temperature changes in field use, the capacitative characteristic of the ionization chamber becomes of paramount importance so that it has been found desirable to balance the ionization chamber by a capacity and ignore the resistance. However, a resistance and a capacity in parallel may be used in place of the capacity 14 if desired.

While the voltages, capacities and resistances have been specifically given as examples of those that may be used it must be understood that these can all be altered within a wide range without departing from the spirit or scope of this invention. For example, the leg resistors need not be of the same resistance. Balance in the bridge may be established instead by using a condenser that has a larger or smaller capacity than the ionization chamber and making the resistance of the opposite leg high or low respectively to compensate.

The circuit element shown in Figure 2 may be embodied in a practical device as illustrated diagrammatically in Figure 1 by enclosing them all in a steel casing or capsule 17 which is adapted to be lowered into a well at the end of a cable 18 which serves both to support the capsule in the well and to carry the output current from the amplifier 16 to recording equipment on the surface. At the surface the supporting cable 18 passes over a measuring wheel 19 and is wound onto a cable drum 20 which is driven by a suitable source of power not shown to raise and lower the measuring instrument in the well. From the cable reel 20 the current which passes up the cable 18 from the amplifier is taken by means of slip rings 21 and brushes 22 and conveyed through an amplifier 23 to a recorder 24 where it is recorded on a moving tape 25. This tape is driven by means of a mechanical transmission system 26 from the measuring wheel 19. Alternatively, it may be driven from the measuring wheel 19 through an electrical transmission system such as the well known "Selsyn" transmission system and this is usually expedient because it is quite often desirable to space the recorder at some distance from the top of the well.

It will be readily understood by those skilled in the art that the particular circuit arrangement herein described is applicable not only to ionization chambers to be used in well surveying but also to ionization chambers to be used for any other purpose where it is difficult to maintain a constant operating voltage. The invention does, however, have a particular application to well surveying in that the conditions under which an ionization chamber must be operated in well surveying are such that make the maintenance of operating voltage a particularly serious problem that is unusually difficult to overcome by any ordinary method.

Furthermore, it will be understood by those skilled in the art that the type of circuit herein described may be applied to ionization chambers which are to be used to measure reflected or scattered radiations caused by radiating the surrounding strata with radiations from a primary source of radiations deliberately introduced into the well, and that the type of circuit herein described may be applied not only to a single ionization chamber but to a plurality of ionization chambers to be used in the same surveying operation. These ionization chambers may be differently shielded or differently spaced and the recording equipment on the surface may be of any desired type. None of these features affect the applicability of the present type of circuit.

In addition the principles of this invention may be applied to a null system of measuring such as that shown in United States Patent 2,219,274, granted to Serge A. Scherbatskoy, Oct. 22, 1940, for example, either by directing a balancing current through one of the leg resistors, by using a balancing resistor in series with the amplifier, or by varying the capacity of the condenser 14 to balance the system. One advantage for this latter system is that variations in battery voltage may be even more completely balanced out because impinging redlations effect substantially the same change in geometric capacity of the ionization chamber regardless of the variations in applied voltage and this is the quantity that is measured.

I claim:

1. In a geophysical prospecting device, the improvements including an electrical circuit that comprises an electrical bridge, an ionization chamber included in one leg of said bridge, a condenser included in an adjacent leg of said bridge, resistances included in each of the other legs of said bridge, a source of electrical potential connected diagonally across said bridge in one direction, a fixed impedance connected diagonally across said bridge in the other direction and a measuring instrument connected across said fixed impedance.

2. In a geophysical prospecting device, the improvements including an electrical circuit comprising an electrical bridge, an ionization chamber included in one leg of said bridge, a condenser included in another leg of said bridge, resistances included in the other two legs of said bridge, a source of electrical potential connected diagonally across said bridge in one direction, a resistance connected diagonally across said bridge in the other direction and a measuring instrument connected across said diagonally connected resistance.

3. A device for geophysical prospecting that comprises a steel casing adapted to be lowered into an opening in the earth, a cable adapted to support said casing in said opening and convey electrical currents from said casing to the surface of the earth, an electrical circuit in said casing comprising an electrical bridge, an ionization chamber included in one leg of said bridge, a condenser included in another leg of said bridge, resistances included in the two other legs of said bridge, a source of electrical potential connected diagonally across said bridge in one direction, an impedance connected diagonally across said bridge in the opposite direction, an amplifier having its input connected across said impedance and its output connected through the supporting cables to the surface of the earth, a recorder on the surface of the earth for recording the output of said amplifier and means for operating said recorder in accordance with the movements of the casing in the wall so as to make a record of the measurements made by said ionization chamber in correlation with determinations of the depth at which it is operating.

4. Apparatus for geophysical prospecting that comprises a steel casing adapted to be lowered into an opening in the earth, an ionization chamber in said casing containing a pair of spaced electrodes and filled with argon at around 1000 pounds per square inch pressure, a bridge circuit of which said ionization chamber forms one leg, a condenser forming an adjacent leg of said bridge circuit and two resistors forming the other legs of said circuit, a battery of approximately 180 volts potential connected diagonally across said bridge so that the ionization chamber and condenser are on the same side of the bridge with reference thereto, a resistance of approximately $10^{12}$ ohms connected diagonally across the bridge in the other direction, an amplifier having its input connected diagonally across the bridge in the same direction as the resistor, a cable serving to support said casing in the well and convey the output current from said amplifier to the surface of the earth, means for continuously determining the position of the casing in the earth, a cable reel and a suitable source of power for raising and lowering the casing in the earth, means for taking the currents from the cable at the surface, an amplifier for amplifying the currents so taken, a recorder for recording the magnitude of the currents amplified and means for driving the recorder in accordance with measuring means so as to cause a record to be made of the magnitude of the currents in correlation with indications of the depth of operation.

5. In combination with a geophysical prospecting device of the type including an ionization chamber through which, during use, a measurable current flows from a potential source connected thereto, means for compensating for changes in current flow due to fluctuations of the potential source that comprises a symmetrical electrical matching circuit and a capacitance in said circuit connected in opposition to the ionization chamber in a manner such that current from the source is applied jointly to the chamber and the capacitance.

6. In combination with a geophysical prospecting device of the type including an ionization chamber through which, during use, a measurable current flows from a potential source connected thereto, means for compensating for changes in current flow due to fluctuations of the potential source that comprises a symmetrical electrical bridge circuit connected in a manner such that one branch of the bridge includes the capacitance and the corresponding opposing branch of the bridge includes the ionization chamber whereby potentials applied to the chamber are in like manner applied to the capacitance.

ROBERT EARL FEARON.

CERTIFICATE OF CORRECTION.

Patent No. 2,316,576.                           April 13, 1943.

ROBERT EARL FEARON.

It is hereby certified that error appears in the printed specification of the above numbered patent requiring correction as follows: Page 3, first column, line 24, for "rediations" read --radiations--; and second column, line 6, claim 3, for "wall" read --well--; and that the said Letters Patent should be read with this correction therein that the same may conform to the record of the case in the Patent Office.

Signed and sealed this 25th day of May, A. D. 1943.

Henry Van Arsdale, (Seal)                            Acting Commissioner of Patents.